No. 786,494. PATENTED APR. 4, 1905.
A. J. GROSSMANN.
MECHANISM FOR PREVENTING SIDE SLIPPING OF PNEUMATIC TIRED WHEELS.
APPLICATION FILED MAR. 14, 1904.
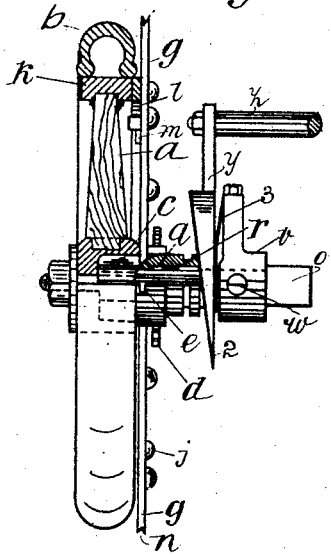
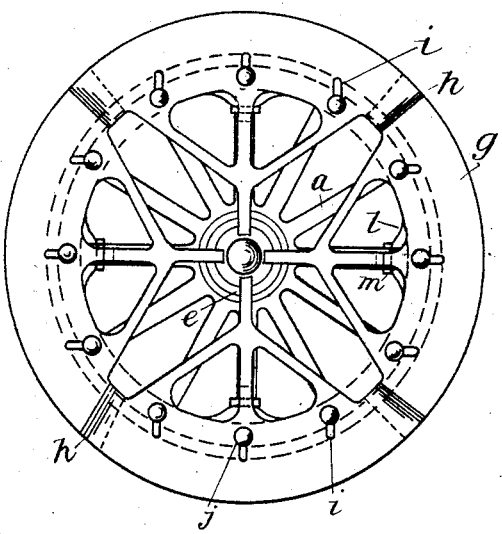
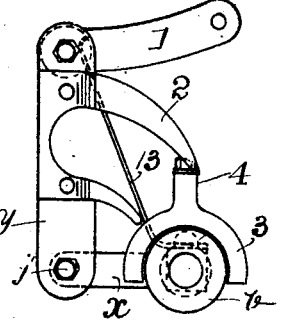
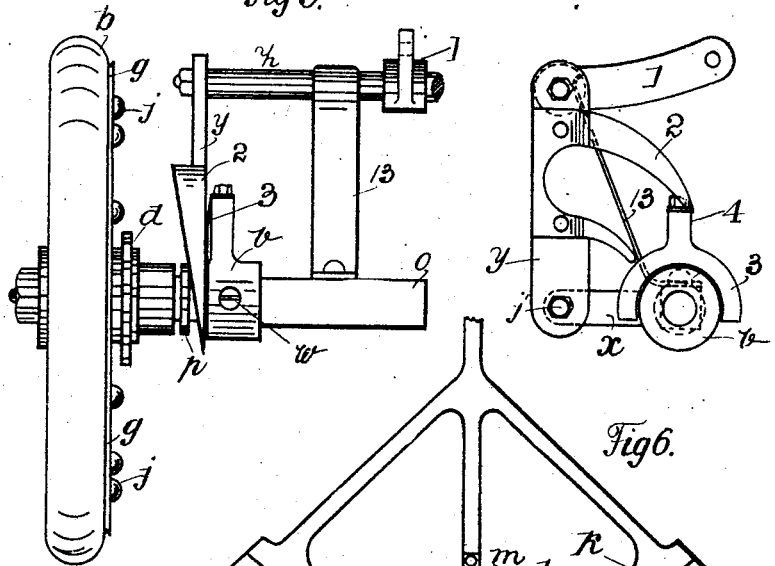
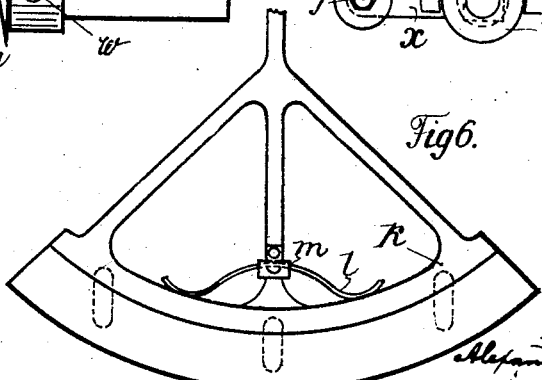
Witnesses.
James E. Babcock
Alys. Scott
Inventor.
Alexander J. Grossmann
per
W. H. Babcock
Attorney.

No. 786,494. Patented April 4, 1905.

UNITED STATES PATENT OFFICE.

ALEXANDER JAMES GROSSMANN, OF LONDON, ENGLAND.

MECHANISM FOR PREVENTING SIDE SLIPPING OF PNEUMATIC-TIRED WHEELS.

SPECIFICATION forming part of Letters Patent No. 786,494, dated April 4, 1905.

Application filed March 14, 1904. Serial No. 198,083.

*To all whom it may concern:*

Be it known that I, ALEXANDER JAMES GROSSMANN, residing at 47 Artesian road, Bayswater, London, in the county of Middlesex, England, have invented certain new and useful Improvements in Mechanism to Prevent Wheel Side Slipping of Motor Cars and Cycles or any Pneumatic-Tire Vehicles; and I do hereby declare the following to be a full, clear, and exact description of the invention, such as will enable others skilled in the art to which it appertains to make and use the same.

My invention consists in improved mechanism to prevent wheel side slipping of motor cars and cycles or any pneumatic-tire vehicles. Its construction and operation will be readily understood by reference to the drawings, in which—

Figure 1 is a side elevation showing car-wheel and arrangement of plates and push rods or staves. Fig. 2 is a front view of the car-wheel, partly in section, showing position of cone and push rods or staves when the segmental plates are in use. Fig. 3 shows detail of lever and taper fork for actuating the cone and push-rod and the position of plates when out of action. Fig. 4 is a side view of forks and lever operating same. Fig. 5 is an enlarged view of grooved periphery of segment. Fig. 6 is an enlarged detail of segment, showing arrangement for securing spring to the stave.

In the drawings, $a$ represents a wooden or metallic car-wheel upon which is mounted a pneumatic tire $b$.

$c$ is the coned or recessed hub, which may be formed of wood hooped in the usual manner, or it may be wholly formed of metal and fitted with pitch-chain or other form of driving-wheel $d$. A series of holes $e$ are formed in the hub or nave $c$ of the wheel. I provide a series of rods or staves $g$, the inner ends of which project through the holes $e$, formed in the hubs. The outer ends of these staves are of a T or segmental shape and overlap at the joints, as at $h$. Slots $i$ are formed in the outer ends of these segments, and through these slots pass studs, bolts, or the like $j$, which are screwed, bolted, or riveted into the wooden felly or metallic rim $k$ of the wheel $a$. To keep the staves of the segmental pieces in the inward position within the holes formed in the hub, I employ springs $l$. These are held in position by and preferably fastened to metallic shoes $m$, secured to the spokes, the base of each spring abutting against the felly of the wheel or rim $k$. The periphery of these segments is preferably grooved or roughened, as at $n$, (see also enlarged view, Fig. 6,) so as to make better contact with the road when in operation, one or more of the grooves being preferably larger than the rest to admit of a suitable packing being inserted, if required.

$o$ is the axle of the car. A coned or beveled push-piece $p$ is bored and preferably slotted, as at $q$, so as to slide backward and forward freely upon a key $r$, sunk in the turned axle $o$. When out of action, the periphery of the expanding segmental plates is well within the diameter of the tire of the wheel. (See Fig. 3.) When, however, the coned push-piece is forced inward, (see Fig. 2,) its coned or tapered portion engages with the inner ends of the rods or staves $g$, forcing them outward against the action of the springs $l$, and so causing the periphery of the segments to project flush with or slightly beyond the tire $b$, thereby gripping the road and avoiding all possibility of side slip. The means whereby I operate these push-pieces is as follows: I provide two L-shaped lugs or brackets $v$, which are secured in any convenient manner, as by set-screws or the like $w$, to the axle $o$. To the longer or horizontal arms $x$ I pivot, by means of bolts, rivets, or the like $j^2$, two plates $y$, the opposite ends of which are rigidly secured by a cross-bar $z$, to which the rod, chain, lever, or other device I, employed for fastening down the lever, is fastened. At a suitable point upon the plates $y$ are secured outwardly-tapering horns or yokes 2. Each of these horns, when a downward pull is exerted upon the cross-bar $z$ by the rod, chain, lever, or the like I, engage with the push-piece $p$, forcing them inward by their wedging action upon the outside of the brackets $v$. (See Fig. 2.) To prevent any tendency to jamb and impart a certain amount of elasticity to the push-pieces, I fasten a leaf-spring 3 upon each of the shorter arms 4 on the L-shaped brackets $v$.

In Fig. 6 is shown one of the form of grooves $n$ that I may employ for giving a better grip to the periphery of the segments. The central groove may be of any convenient depth, fitted with a fibrous substance 15, if required, and to keep this in position I may employ bolts or screws $j$, as shown.

What I claim as my invention, and desire to secure by Letters Patent, is—

1. The combination with a vehicle fitted with pneumatic tires of the improved skid, consisting of overlapping T-shaped or segmental plates, secured by bolts, set-screws, rivets or the like passing through slot-holes formed in the segments into the felly, rim or spokes of the wheel, the staves or rods forming the inner or central part of said segments, passing through holes in the hub and the cone or push piece or pieces operated by the wedge-shaped horns for forcing outward the rods and segments and enabling the same to be withdrawn by the action of the springs in the manner shown.

2. In combination with a wheel, a skid consisting of outwardly-movable segmental parts, a conical push-piece adapted to engage the inner surfaces of said segmental parts and force them outward so that the periphery of the said skid projects beyond the periphery of the said wheel to prevent its lateral slip, and a device acting transversely against the said conical push-piece to force it against said inner surfaces, substantially as set forth.

3. In combination with a wheel, and a radially-expansible sectional skid, for preventing its lateral slip, a push-piece arranged to force the parts of the said skid outward and springs arranged to impart elasticity, to the said push-piece substantially as set forth.

4. The combination with a segmental skid operated by means of push-pieces splined upon the axle of the plates pivoted to the horizontal arms secured to said axle, the horns fastened to the pivoted plates and the cross-bar to which the actuating-lever is attached.

5. In combination with a wheel, a skid consisting of radially-expansible segmental parts, a push-piece directly engaging them to force them out beyond the periphery of the said wheel in order to prevent its lateral slip and a part having an inclined face movable transversely in contact with the rear of the push-piece, substantially as and for the purpose set forth.

6. In combination with a wheel, a skid consisting of radially-expansible segmental parts, a conical push-piece adapted to engage the said parts and a wedge-shaped horn or yoke which forces the push-piece into operative engagement with the said segmental parts substantially as set forth.

In witness whereof I have hereunto signed my name in the presence of two subscribing witnesses.

ALEXANDER JAMES GROSSMANN.

Witnesses:
H. D. JAMESON,
A. NUTTING.